3,012,081
MANUFACTURE OF 1,1,1-TRICHLOROETHANE
Franklin Conrad and Albert J. Haefner, Baton Rouge, La., assignors to Ethyl Corporation, New York, N.Y., a corporation of Delaware
No Drawing. Filed Sept. 29, 1960, Ser. No. 59,153
2 Claims. (Cl. 260—658)

This case is a continuation-in-part of application Serial No. 855,553, filed November 27, 1959, and now abandoned.

This case relates to a method for the production of 1,1,1-trichloroethane. More particularly, the invention relates to an improved and economical process for the concurrent chlorination of ethyl chloride and 1,1-dichloroethane to produce 1,1,1-trichloroethane.

Methyl chloroform, or 1,1,1-trichloroethane, is of importance as a metal degreasing solvent when properly stabilized.

Various processes are known for the manufacture of 1,1,1-trichloroethane. These processes generally offer many disadvantages. Such disadvantages include low yields, low conversion to useful by-products, necessity of operating discontinuously, high catalyst consumption, high carbonization, etc.

It is, therefore, a primary object of this invention to avoid these and many other defects, by providing an efficient chlorination process which provides a high production of 1,1,1-trichloroethane without the formation of large quantities and varieties of useless by-products. Another object is to provide an integrated and improved process enabling the more efficient conversion of ethyl chloride and 1,1-dichloroethane to 1,1,1-trichloroethane in a reaction requiring a minimum of equipment, such operation being achieved smoothly and efficiently. In particular, it is an object of this invention to provide a useful and practical process for the chlorination of 1,1-dichloroethane to 1,1,1-trichloroethane without incurring excessive formation of carbon and other by-products.

These and other objects are achieved according to the present invention which is characterized by the steps of simultaneously contacting ethyl chloride and 1,1-dichloroethane with chlorine within a reaction zone. The substitution chlorination reaction is maintained at a temperature of approximately 700 to 900° F., and preferably at a temperature of from about 700 to 800° F. The reaction is conducted at atmospheric pressure up to 120 pounds per square inch gauge. A preferred pressure range is from about 50 to 80 pounds per square inch gauge.

We have found that ethyl chloride, even in relatively small amounts, can be added to 1,1-dichloroethane and the resulting mixture chlorinated without excessive carbon formation. Also there is no excessive formation of undesirable by-products. This discovery has resulted in a quite remarkable process for the manufacture of 1,1,1-trichloroethane because chlorination of substantially pure 1,1-dichloroethane is a reaction favoring excessive carbon formation, and normally excessive carbon accumulation within a reaction zone is so serious as to make operation of such a process impractical, if at all possible. Pursuant to the present invention not only is the 1,1-dichloroethane chlorinated to 1,1,1-trichloroethane, the desired product, but the ethyl chloride itself is converted to 1,1-dichloroethane which in itself gives rise on further chlorination to 1,1,1-trichloroethane. The ethyl chloride thus performs the dual function of making possible a process for the chlorination of 1,1-dichloroethane to 1,1,1-trichloroethane without excessive carbon formation and also serving as a useful feed material to the process.

In the process it is desirable to feed chlorine:total organics at a molar feed ratio of from about 0.2 to 0.7; a preferred range is from about 0.4 to 0.6.

The ethyl chloride:1,1-dichloroethane ratio within the feed stream is maintained at such ratio that there will be no depletion of 1,1-dichloroethane. A satisfactory ratio of ethyl chloride:1,1-dichloroethane within the feed stream is from about 0.12 to about 0.74, with a ratio of about 0.3 to 0.7 being preferred. At a preferred ratio (0.44) the feed stream will consist of about 20 percent ethyl chloride and about 47 percent 1,1-dichloroethane.

Another highly desirable feature of this operation is that no preheating of the feed stream is necessary. This results from the fact that the ratio of ethyl chloride:1,1-dichloroethane is such that the heat liberated by the chlorination reaction is easily sustained at proper temperature conditions for this operation. The substitution chlorination reaction is conducted within a fluidized bed or heat transfer medium. Such a medium is composed of fine iron-free sand through which the gases are passed. The superficial velocity of the gases entering the reaction is maintained at from about 0.3 to 3 feet per second linear velocity. A preferred range is from about 1 to 2 feet per second. No catalyst is employed in the reaction.

The chlorinated reaction products are removed as a vapor, are cooled and quenched to remove the small amount of carbon formed in the reaction.

To illustrate a major advantage derived pursuant to the practice of the present invention, a number of runs were made wherein mixed 1,1-dichloroethane-ethyl chloride streams were utilized as feeds to the chlorination process as compared with runs wherein high purity 1,1-dichloroethane feed streams were utilized as feeds. Representative demonstrations of these tests using substantially pure 1,1-dichloroethane under a variety of conditions are shown as runs 1, 2 and 3 in Table I below. The temperature of the process was varied within a range of from 650° F. to 800° F. and the molar ratio of chlorine:1,1-dichlorethane was varied from 0.465 to 0.702. The molar ratios of chlorine:1,1-dichloroethane in the particular runs shown were 0.50 (run 1), 0.465 (run 2) and 0.702 (run 3). The total weight of carbon formed, based on the total feed to the reaction, was measured and is shown for each of these runs. Similarly, numerous runs according to this invention were made wherein mixed 1,1-dichloroethane-ethyl chloride streams were employed as feeds to the chlorination reaction. Illustrative of these are runs 4, 5 and 6 of Table I. The mixed feed streams contained ethyl chloride in 1,1-dichloroethane within a range of from about 12 to about 35 weight percent. The mixed-feed runs were conducted at a temperature range of 700° F. to 800° F. and the chlorine:organic feed ratio was varied within a range of from 0.274 to 0.676. The molar ratios of chlorine:total organics in these particular examples were 0.274 (run 4), 0.676 (run 5) and 0.559 (run 6). The total carbon formation, based on the total quantity of the chlorinated hydrocarbon feed, was also determined in these runs and was found to be substantially less than in the runs where substantially pure 1,1-dichloroethane feeds were employed. This is vividly illustrated by comparison of the carbon formation in runs 4, 5 and 6 with that in runs 1, 2 and 3. In fact, it was also found that utilization of the mixed 1,1-dichloroethane-ethyl chloride streams produced as little carbon as, and often less than, the pure ethyl chloride. This is demonstrated by comparison of the carbon formation in runs 4, 5 and 6 with run 7, a typical run wherein an essentially pure ethyl chloride feed was employed.

TABLE I

*Decreased carbon formation resultant from the use of mixed 1,1-dichloroethane-ethyl chloride feeds*

| Run | Reactor Temp., °F. | Feed Reactants, Weight Percent | Total Carbon, Weight Percent of Total Feed |
|---|---|---|---|
| 1 | 650–750 | 1,1-dichloroethane | 0.311 |
| 2 | 700 | ----do---- | 0.327 |
| 3 | 800 | ----do---- | 0.295 |
| 4 | 700 | 74.51% 1,1-dichloroethane<br>25.08% ethyl chloride<br>0.41% other chlorinated hydrocarbons | 0.082 |
| 5 | 800 | 87.3% 1,1-dichloroethane<br>12.7% ethyl chloride | 0.107 |
| 6 | 800 | 65.30% 1,1-dichloroethane<br>34.24% ethyl chloride<br>0.46% other chlorinated hydrocarbons | 0.157 |
| 7 | 700 | ethyl chloride | 0.120 |

It is thus clearly shown by the above experimental data that the mixed feed in all cases provided greatly decreased carbon formation, in fact, as much as a 400% decrease in the formation of carbon. Also, as stated, the decrease in carbon formation when utilizing the mixed feed is of such extent that carbon formation is as low as, and sometimes even lower than, in the case where ethyl chloride is used alone as a feed (run 7).

A wide number of runs were also conducted wherein the carbon in the off-gas from the processes was determined, this providing an accurate means of determining the relative proportion of carbon formation in the given process. Thus, by monitoring and measuring the off-gas from the process the total solids (essentially carbon) carried over and contained within the product gas, an accurate and relative measurement of the total carbon formed in the process is furnished. Table II shows representative results from a large number of runs wherein a process employing a mixed 1,1-dichloroethane-ethyl chloride feed is compared with a process employing a feed consisting essentially of 1,1-dichloroethane.

TABLE II

*Decreased carbon formation resultant from the use of mixed 1,1-dichloroethane-ethyl chloride feeds*

| Reactor Temp., °F. | Feed | Carbon in Off-Gas, Percent of Total Feed |
|---|---|---|
| 700 | 1,1-dichloroethane | 0.169 (Average of 11 runs). |
| 700 | 74.51% 1,1-dichloroethane<br>25.08% ethyl chloride<br>0.41% other chlorinated hydrocarbons | 0.047 (Average of 13 runs). |

It is thus shown that a significant decrease of carbon, almost 400 percent, occurred in the process utilizing a mixed 1,1-di-chloroethane-ethyl chloride feed as contrasted with one employing an essentially pure 1,1-dichloroethane feed.

To further illustrate the operation of the present process, the following examples are given though they are not intended as limitations. All units and proportions are given by weight unless otherwise specified.

The example immediately following demonstrates a reaction conducted under generally optimum conditions.

EXAMPLE I

A mixture of 20.5 parts ethyl chloride and 46.5 parts 1,1-dichloroethane are fed with 33 parts chlorine into a reaction chamber containing a fluidized bed. The substitution chlorination reaction is conducted and maintained at a temperature of 800° F. and at 70 pounds per square inch gauge pressure. The product stream is removed from the reaction vessel as a vapor, is quenched and sent to a fractioning column. The product is found to contain 21.0 percent 1,1-dichloroethane and 31.8 percent 1,1,1-trichloroethane. Other useful by-products obtained are about 2.7 percent 1,2-dichloroethane and 1,1,2-trichloroethane, and about 12.0 percent vinyl chloride and vinylidene chloride. The balance of the product is hydrogen chloride. Only about 1.5 percent of the products obtained is waste. 1,1-dichloroethane produced in the reaction is recycled with a fresh feed stream to the reaction zone.

The following example demonstrates the invention under higher conditions of temperature, pressure, etc.

EXAMPLE II

Again, as in the foregoing example, 18.6 parts ethyl chloride and 42.3 parts 1,1-dichloroethane, with 39.1 parts chlorine are fed into the reaction zone within which is contained a fixed fluidized bed. The superficial velocity of the entering gases is maintained at 1.5 feet per second linear velocity. The reaction is conducted and maintained at a temperature of 900° F. and at 80 pounds per square inch gauge pressure. The product removed from the reaction zone as a vapor is quenched and sent to a fractionating column. An analysis of the products shows 14.0 percent 1,1-dichloroethane, 38.1 percent 1,1,1-trichloroethane, 2.2 percent 1,2-di-chloroethane and 1,1,2-trichloroethane, 16.0 percent vinyl chloride and vinylidene chloride, and only about 2.0 percent tetrachloroethanes and waste. The balance of the product is hydrogen chloride. The 1,1-dichloroethane produced in the reaction is recycled to the reaction zone with a fresh feed stream.

The following example demonstrates the invention under decreased conditions of pressure, temperature, etc.

EXAMPLE III

Example I is again repeated except that in this instance the feed stream, which is introduced into the reaction zone at a superficial velocity of 1.5 feet per second linear velocity, consists of 22.3 parts ethyl chloride, 50.5 parts, 1,1-dichloroethane, and 27.2 parts chlorine. The reaction is conducted at a temperature of 700° F. and at a pressure of 50 pounds per square inch gauge. The exit gases are quenched and sent to a fractionating column. Analysis of the products shows 34.7 percent 1,1dichloroethane, 16.0 percent 1,1,1-trichloroethane, 6.3 percent ethyl chloride, 4.5 percent 1,2-dichloroethane and 1,1,2-trichloroethane, and 5.9 percent vinyl chloride and vinylidene chloride. The balance of the product is hydrogen chloride. The waste product amounts to only about 1.5 percent tetrachloroethanes and other wastes. The 1,1-dichloroethane is added to fresh ethyl chloride and recycled to the reaction zone.

From the foregoing examples it is seen that the process of this invention is subject to a fairly wide range of reaction conditions, which may be practiced without departing from the spirit and scope of the invention.

Having described the invention, what is claimed is:

1. A method for the concurrent manufacture of 1,1-dichloroethane and 1,1,1-trichloroethane comprising simultaneously reacting ethyl chloride and 1,1-dichloroethane with chlorine at a temperature of from about 700 to 900° F. and at a pressure of from about atmospheric to 100 pounds per square inch gauge.

2. The method of claim 1 wherein the ethyl chloride and 1,1-dichloroethane are reacted at a temperature of from about 700 to 800° F. and at a pressure of from about 50 to 80 pounds per square inch gauge.

No references cited.